United States Patent
Cappio et al.

(10) Patent No.: US 10,339,275 B2
(45) Date of Patent: Jul. 2, 2019

(54) LICENSE CONFIRMATION VIA EMBEDDED CONFIRMATION CHALLENGE

(75) Inventors: Adam Cappio, Seattle, WA (US); Joshua D. Hug, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 2470 days.

(21) Appl. No.: 11/110,303

(22) Filed: Apr. 19, 2005

(65) Prior Publication Data

US 2006/0235802 A1 Oct. 19, 2006

(51) Int. Cl.
*G06F 21/10* (2013.01)

(52) U.S. Cl.
CPC ...... *G06F 21/10* (2013.01); *G06F 2221/2103* (2013.01)

(58) Field of Classification Search
CPC .................................................. G06Q 20/1235
USPC .................... 705/1, 26, 27, 51, 53, 57, 59
See application file for complete search history.

(56) References Cited

U.S. PATENT DOCUMENTS

| | | | | |
|---|---|---|---|---|
| 5,715,403 | A * | 2/1998 | Stefik | G06F 21/10 705/44 |
| 6,226,618 | B1 * | 5/2001 | Downs | G06F 21/10 380/279 |
| 2005/0102240 | A1 * | 5/2005 | Misra | G06Q 30/06 705/59 |
| 2006/0173787 | A1 * | 8/2006 | Weber | G06F 21/105 705/59 |

OTHER PUBLICATIONS

Bruce Schneier, Applied Cryptography Second Edition1996 Pubished by John Wiley & Sons Inc pp. 53-54.*

* cited by examiner

*Primary Examiner* — Chinedu C Agwumezie
(74) *Attorney, Agent, or Firm* — Barnes & Thornburg LLP

(57) ABSTRACT

A method of operation on a license server comprises sending by the license server, a license, including a confirmation challenge, to a rights manager of a client device. The method of operation further comprises receiving by the license server, a confirmation response from the rights manager of the client device, the confirmation response being transmitted by the rights manager of the client device in accordance with data recovered by the rights manager from the confirmation challenge.

18 Claims, 4 Drawing Sheets

LICENSE CONFIRMATION VIA EMBEDDED CONFIRMATION CHALLENGE

TECHNICAL FIELD

Embodiments of the present invention relate to the fields of content licensing, and content rights management.

BACKGROUND

The rights management associated with content rendered on electronic devices has evolved over the last several years. Traditionally developers of content rendered on electromechanical or electronic devices would rely on copyright law and/or inherent quality issues associated with reproduction of items produced using older technologies. As the digital revolution has occurred, content to be rendered on today's electronic device is now reproducible at the digital level. This may result in the ability to generate copies of content that are as good as the original from which the copies were generated. Thus, in mass, large number of copies of content can be made repeatedly with no degradation in quality. This may create concerns for holders of, among others, copyrights of the content being copied. Rights management has become an interesting topic as a result of these concerns.

License has been employed to manage rights associated with content. However, it is not always certain that a license is received and applied to the content by an intended licensee, especially, when contents are distributed online, as the licensor may be deceived by a malicious interceptor of the license and/or the distributed content. This is especially troublesome, when the license is a revocation license.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to methods for confirming proper receipt, recovery and/or application of a license by a licensee client device, and apparatuses adapted to practice the methods in part or in whole.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

Figure 1:
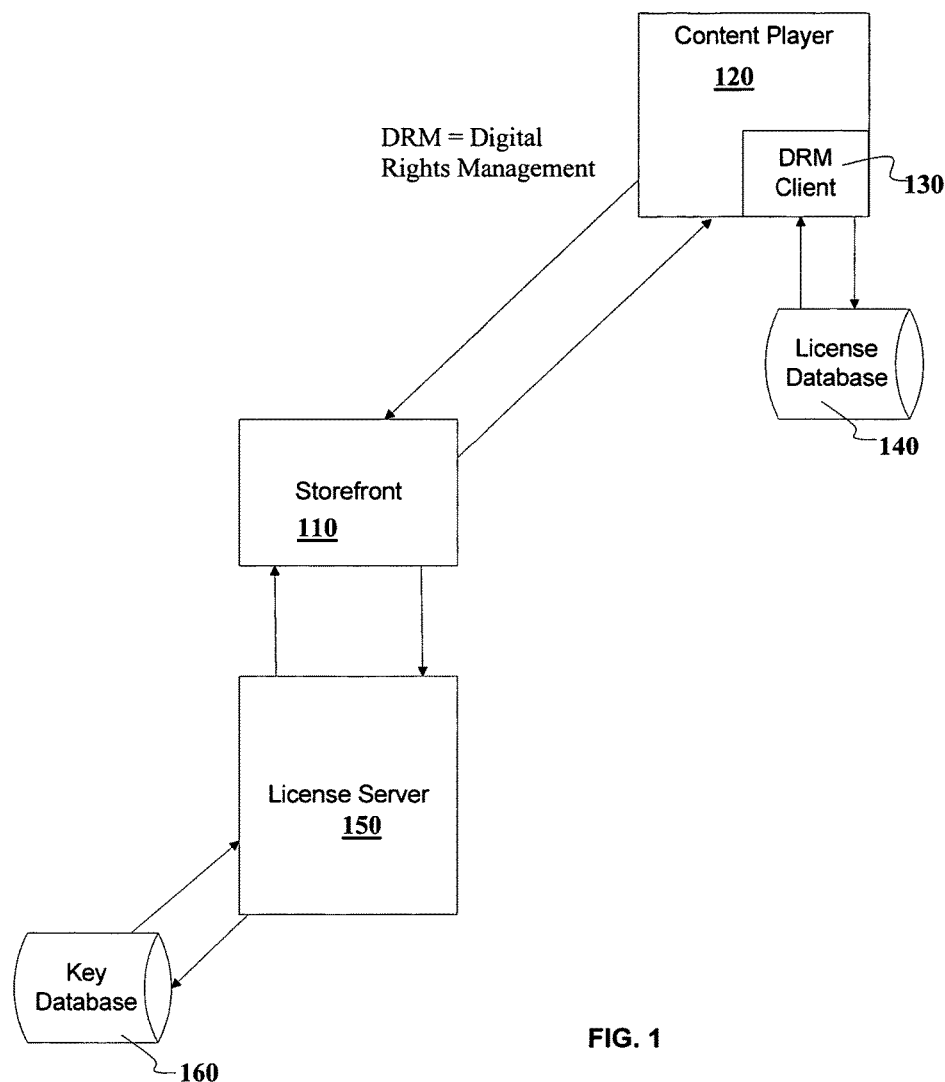
FIG. 1 illustrates an overview of the invention, in accordance with various embodiments.

FIG. 1 illustrates a system utilizing a licensing method of the present application, in accordance with one embodiment. As will be described in more detail below, the licensing method of the present invention includes confirmation of application of the license via an embedded confirmation challenge, enhancing the reliability and efficiency for providing such confirmation. The term "confirmation" as used herein may include, but is not limited to, a communication conferring to a recipient of the communication an assurance on a point or an issue. The phrase "confirmation challenge" as used herein may include, but is not limited to, a communication from a sender of the communication confronting a recipient of the communication to prove or otherwise demonstrate that the recipient is an authorized or intended recipient.

For the exemplary embodiment, there is communication between a content service present on a server and a client device. The server may be, for example, an online storefront 110 providing an ability for a user to purchase and download content. In one usage scenario, a user may have a client device such as a content player 120 which may be utilized to play, execute, or otherwise render the purchased/downloaded content. Content may be, for example, music, videos, games, software applications and the like. Content player may obtain content in a variety of manners. For example, a user may download content from storefront 110 to the content player 120. When content is played or executed by content player 120, a rights manager, such as digital rights manager (DRM) 130, on the content player 120 may attempt to check for proper licensing of the content to be played or executed. For example, the DRM 130 may query a license database 140 to ensure that the content player 120 is in possession of a proper license for a particular content before executing or rendering that particular content. If a proper license is not found, content player 130 may refuse to execute or render the particular content, and/or facilitate acquisition of the proper license before executing or rendering the particular content.

Licenses may be obtained and deposited in the license database 140 in a number of manners. In one embodiment, licenses may be sent from the storefront 110 to the DRM 130 on the content player 120. For example, once the storefront 110 verifies that the content player 120 is to be authorized to play a particular content, the storefront 110 may send to a licensing server 150 a request to generate a license for the particular content on the particular content player enabling its rendering on that content player. The request may have in it the type of license to be generated as well as information regarding the content player 120 that is to render the content.

For example, the information regarding the content player 120 may include a unique identifier of the DRM 130 resident on the content player 120. The type of license to be generated may include various rights that the content is authorized for in light of the determined authorization. For example, content on content player 120 may be licensed to be rendered in an audio only mode, while in other circumstances, the content may be licensed for both audio and video rendering.

When sending licenses from the storefront 110 to the DRM 130 of a target device, e.g. content player 120, the storefront 110 may not know with any degree of certainty that the DRM 130 of the content player 120 properly received and applied the license. Typically, the management of the transfer of a license being sent to the DRM 130 of the content player 120 is limited to that provided by a network over which the license in communicated. For example, a network communication protocol may provide for certain assurances that a file is transferred to a target device. However, since most licenses are encrypted, there is no guarantee that the license is actually successfully decrypted and applied by the DRM 130. That is, there is no indication to the storefront 110 that the license was successfully received and subsequently decrypted and applied by the DRM 130 of the content player 130.

The term "license" as used herein may include, but is not limited to, a license that confers certain rights to certain contents, as well as a license that revokes certain rights of certain contents. Thus, unless explicitly excluded, the term, including its usage in the claim, should be accorded a meaning that includes either conferring or revocation of rights, or both.

In accordance with embodiments of the present application, license server 150 is adapted to create and employ a license that includes a confirmation challenge having data for the intended licensee rights manager to provide an affirmation confirmation on the successful receipt, recovery and application of the license. Resultantly, the desired affirmative confirmation may be seamlessly, reliably and efficiently obtained from a licensee client device.

By way of example, refer again to FIG. 1, the storefront 110 may determine that a revocation license is to be sent to the DRM 130 of a content player 120. For example, a user of the content player 120 may decide to transfer the rights associated with one or more content present at the content player 120 to another device. Thus, the DRM 130 of the content player 120 may make a request to the storefront 110 to make the transfer. To facilitate the request, the storefront 110 may cause to be generated a revocation license to be sent to the content player 120. In one embodiment, the storefront 110 may obtain information identifying the DRM 130 of the content player 120 that is requesting the transfer. The storefront 110 may then send the identifying information of the DRM 130 to a license server 150 along with a request to generate a revocation license for the one or more content. The identifying information of the DRM 130 may include a public key, as described below. Alternatively, based on the identifying information of the DRM 130, the license server 150 may query a key database 160 to obtain a public key for the DRM 130. The storefront 110 may also send to the license server 150, along with the request to generate a revocation license, a confirmation challenge to be included with the generated revocation license. The license server 150 may then generate the revocation license, including the confirmation challenge, for the one or more content on the content player 120. The generated revocation license may then be sent back to the storefront 110 from the license server 150. The storefront 110 may then send a message containing the revocation license to the content player 120. The content player 120 may pass the message containing the revocation license to the DRM 130. The DRM 130 may then decrypt the message containing the revocation license, extract the confirmation challenge from the revocation license, in turn, the confirmation response data from the confirmation challenge, and respond with the confirmation accordingly.

In various embodiments, the license provided to a rights manager may be encrypted. Various forms of encryption known in the art may be utilized to provide the encrypted communication between, for example, a server and a rights manager of a client device. For example, in one embodiment, the license may be encrypted utilizing a public key. The public key may be part of a public/private key pair corresponding to the rights manager of the client device. The public key may be provided to a license server responsible for generating a license as part of the identifying information of the rights manager of a client device.

The confirmation challenge may include any method of providing feedback from the rights manager to a server. In various embodiments, the confirmation challenge containing the data to provide the confirmation response may be structured in a manner, where the data is automatically processed by the DRM 130 of the client device, as part of the decryption and application process of the received license. In various embodiments, the confirmation challenge may contain an in-line identifier of a resource to which the rights manager is to make an access, thereby "implicitly" providing the confirmation response when the access is made. In particular, in one embodiment, the confirmation challenge comprises an in-line Uniform Resource Locator (URL). The URL may include an Internet address of, for example, a server responsible for monitoring successful receipt and application of licenses. The URL may further include a unique identifier identifying the license, to be provided as part of the confirmation response, allowing the server responsible for monitoring successful receipt and application of licenses to associate the response with the appropriate license.

In various embodiments, after generating, or causing to be generated, a license to be sent to a rights manager of a client device, a server may keep the unique identifier for subsequent utilization after the license is sent to the rights manager of the content player. In response to the sent license containing a confirmation challenge, the server may receive from the rights manager a confirmation response. The confirmation response may be sent from the rights manager in response to the data recovered by the rights manager from the confirmation challenge, while processing the received license. The confirmation response may include, for example, the unique identifier recovered as part of the data. The server may compare the unique identifier that was sent with the license to the unique identifier received from the rights manager of the content player. If the two identifiers match, then the server may be able to determine that the license was received by the rights manager and successfully recovered. Since the rights manager possess the necessary secret to decrypt, recover and respond to the confirmation challenge, the server may trust the rights manager will properly execute and successfully apply to license.

This confirmation of successful receipt, recovery and application of the license from the rights manager may be considered more trustworthy than other acknowledgements provided to the server. As previously discussed, prior communications involved one or more layers of a network protocol providing acknowledgements of successful receipt by a target client device of communications that constituted the license. For example, the various network layers may provide indications that files containing a license are successfully transmitted from the server to the target client device.

However, the server's may not be assured of a trusted communication. It is possible, for example, for a spoofing device to be placed on the network that could spoof the network acknowledgements of the receipt of a file, or files, containing the license to be sent to a target client device. Thus, a server sending down one or more files containing the license may, under this spoofing condition, be lead to believe that the rights manager in target client device has successfully received the license and, thus, will act-on the license accordingly. However, in such a condition, the license may not be received by the rights manager in the target client device as the license is intercepted by the spoofing device. Thus, in such a condition, the rights manger of the target client device may not recover and process the license properly. This is especially significant when the license is a revocation license.

The rights manager, when tasked with acting on one or more data provided in association with a license, in a manner that provides information to a server verifying licenses provide to client devices, may provide greater security. Since the license is encrypted in a manner such that only the appropriate rights manager may successfully decrypt the license, such as by using a private key associated with the public key used to encrypt the data, the server may have greater confidence that the license will be acted on appropriately. For example, if the license is encrypted using a relatively secure encryption algorithm in association with a public key associated with the rights manager, even if a device is placed on the network, intercepts the files associated with the license, the device will not be able to decrypt the license since the device is not in possession of the private key. As a result of not being able to decrypt the license, the spoofing device may not be able to determine what was the data enclosed with the license. As a result, the confirmation action associated with the data may not be executed. From this inaction, the server may infer that the client device did not receive the license. The inaction further allows the server to assume that the license was not acted upon. However, as a result of receiving the confirmation, the server may have greater confidence that the license was processed by a trusted rights manager, and that the revocation of the license will indeed be performed by the trusted rights manager.

While the example above is provided with respect to a revocation license, the above model may be performed with any type of license provided to a rights manager of a client device from a server. In addition, while the above-described embodiment comprises a storefront and a license server, in various other embodiments, the storefront and license server may be combined such that the server communicating with the client device also generates the license.

Figure 2:
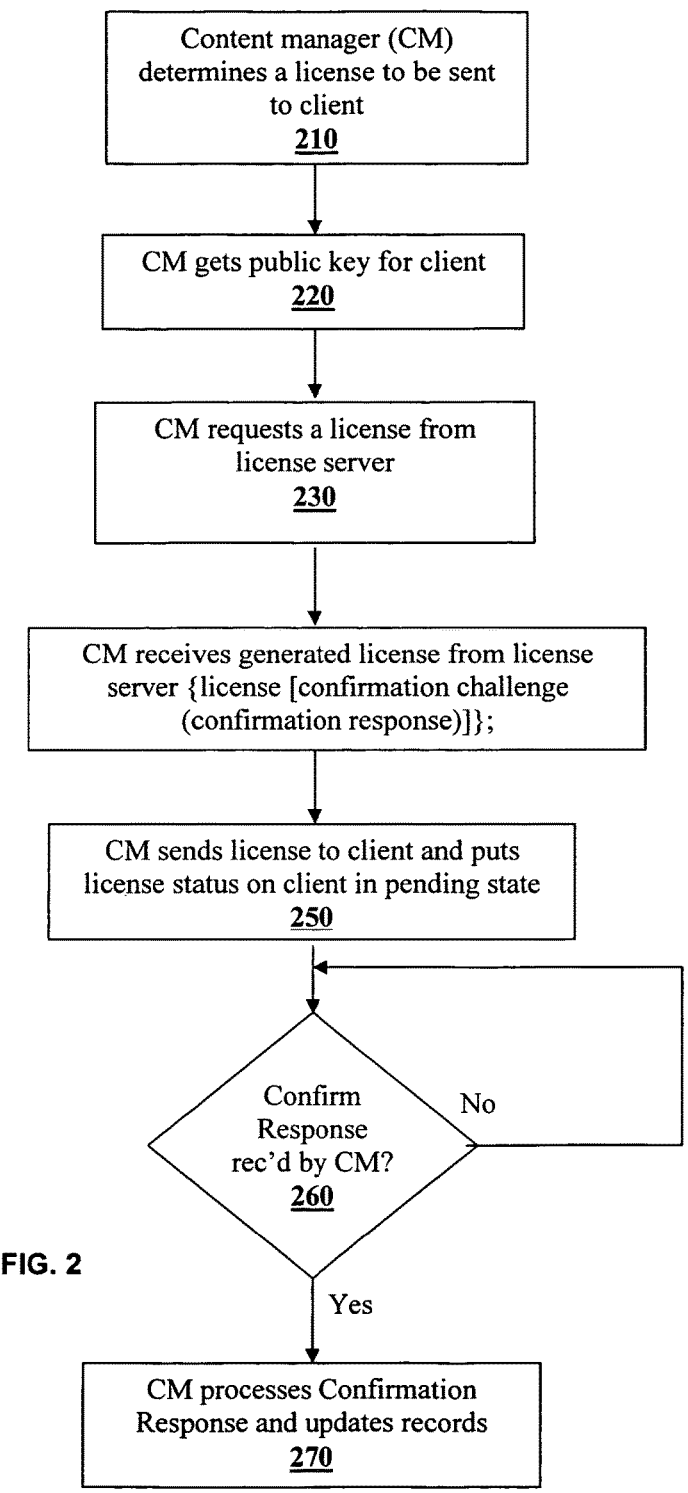
FIG. 2 illustrates a flow chart view of selected operations of the server of FIG. 1 in accordance with various embodiments.

FIG. 2 illustrates the operation of a server providing a license with a confirmation challenge to a client device, in accordance with one embodiment. As illustrated, a content manager on a server may determine that a client is to be sent a license relating to particular content present on the client, at 210. Such a determination may be made as a result of a request from the client. In other cases, the determination may be made as a result of information from a third party that is provided to the content manager.

For the embodiment, the content manager may then obtain the public key corresponding to a rights manager of the client, at 220. The content manager may provide to a license server a license type to be generated along with the public key of the client, or the rights manager of the client, for whom the provided license type is to be generated along with a confirmation challenge to accompany the license, at 230.

The license server may then generate the appropriate license, including the confirmation challenge, for the client. The license server may then provide the license to the content manager, at 240.

The content manager may then provide the license with the confirmation challenge to the client. Upon providing the license with the confirmation challenge to the client the content manager may place the status of the license for the client in a pending state, at 250. The content manager may wait until it receives the confirmation response, at 260, from the client before updating a database, at 270, containing the status of licenses.

A server, for example, may maintain a database for use by other services. These other services may provide information to other devices regarding the status of various licenses. In various embodiments, the server may, after a period of not receiving a confirmation response, perform additional actions. For example, in one embodiment, after a period of time, if a confirmation response is not received from the client device, the license may be re-sent to the client device. By providing a confirmation challenge to a client device, and obtaining a confirmation response from the client device, a server can be reasonably certain that a license was successfully received, recovered and applied by the intended client device.

Figure 3:
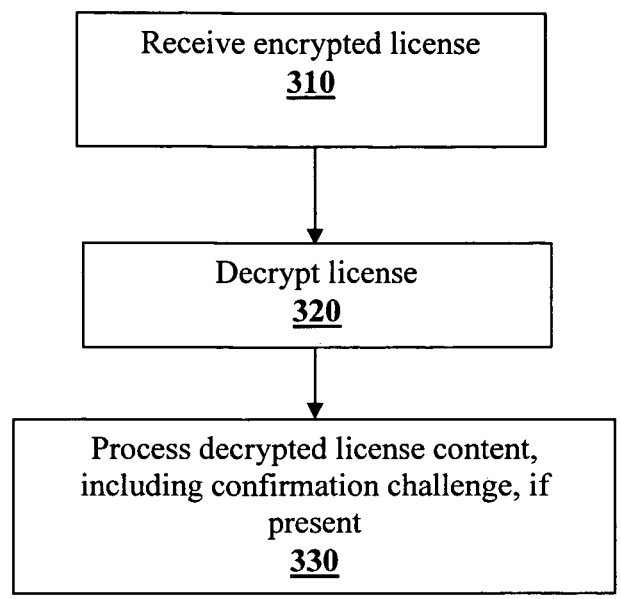
FIG. 3 illustrates a flow chart view of selected operations of the client device of FIG. 1 in accordance with various embodiments.

FIG. 3 illustrates the operation of a client, including a rights manager, in accordance with one embodiment. In the embodiment illustrated, a client may receive an encrypted license from a storefront. The client may provide the license from the storefront to a rights manager resident on the client, at 310. The rights manager may decrypt the license received, at 320. After decrypting the license, the rights manager may process the decrypted license, at 330. As described earlier, in the course of processing the decrypted license, the rights manager may process the in-line data, including an in-line confirmation challenge. In various embodiments, the in-line confirmation challenge includes data for providing a confirmation response to the license server. In various embodiments, the data include a URL identifying a resource which the client device is to make an access, thereby providing the confirmation response.

In one embodiment, the confirmation challenge may consist of a Uniform Resource Locator (URL) that is to be utilized by a client device in a confirmation response. For example, a confirmation challenge may consist of a URL that contains a unique identifier as indicated in the example below:

https://www.server.com/resp?confirmChall=CrnQC1y m24ylXkWUuReJbGlqzztpSbab6fZrlE obBkYJKjNx8r The unique identifier may include an alphanumeric string that may contain upper case, lower case and numeric symbols. Thus, a 50 symbol identifier may take on any value of $50^{62}$ identifiers, effectively rendering the identifier unique. Thus, when a confirmation response is sent to the appropriate service on the addressed server, that matches an expected identifier, the server can be reasonably certain that the proper client device has successfully received and decrypted the license. The expected identifier may be the identifier recovered from the license, or a derivative identifier generated from the recovered identifier in accordance with a deterministic process a trusted rights manager performs.

Figure 4:
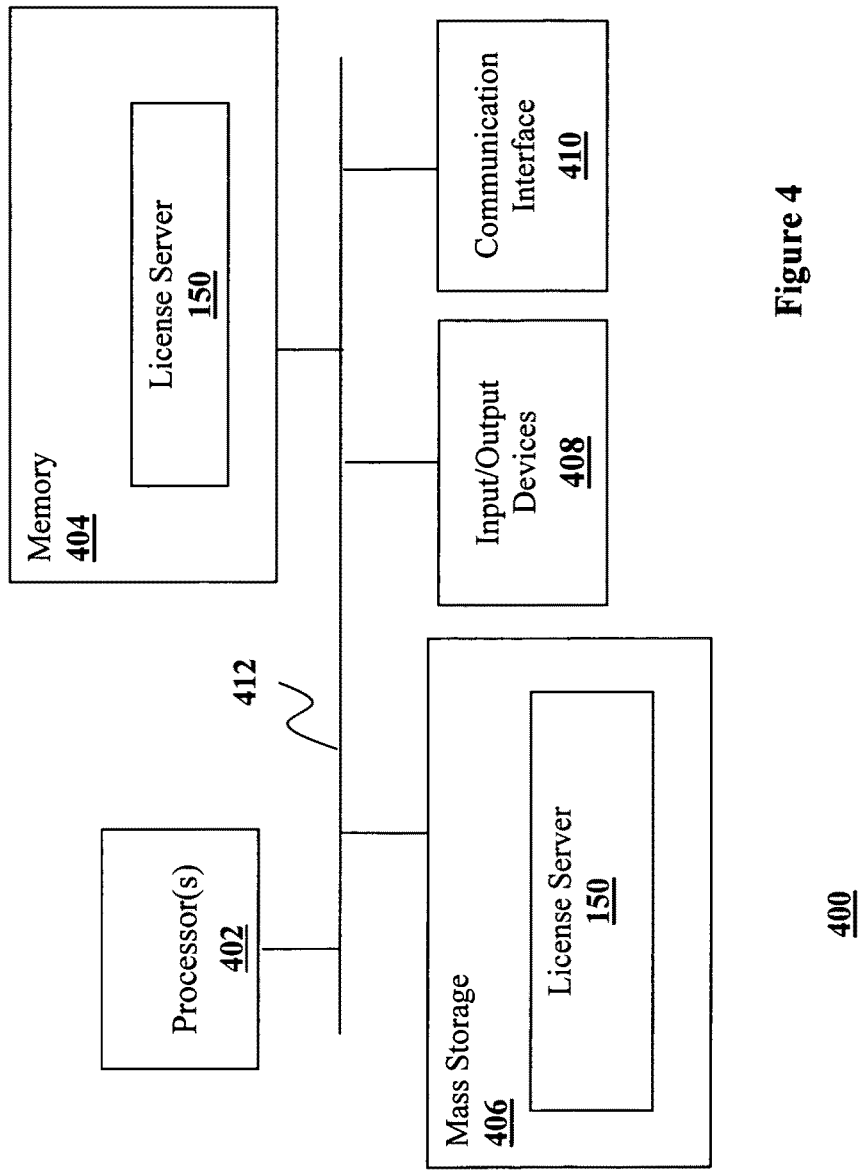
FIG. 4 illustrates an example computing device suitable for practicing the license server of FIG. 1 thereon, in accordance with various embodiments.

FIG. 4 illustrates a block diagram view of an example computing device suitable for use as a license server to practice the present invention, in accordance with one embodiment. As illustrated, computing device 400 may include processor 402, memory 404 coupled to each other via bus 412. Further, computing device 400 may also include mass storage device 406. I/O devices 408, and communication interface 410 coupled with the earlier described elements as shown.

Each of the elements represents a broad range of the corresponding element known in the art or to be designed consistent with the teachings of the present invention. They perform their conventional functions, i.e. processing, storage, and so forth. In particular, memory 404 and mass storage 406 are employed to store temporal and persistent copies of license server 105 respectively.

In various embodiments, communication interface 410 may included, but is not limited to, a networking interface as well as a serial interface, and computing device 400 may be a server, a desktop computer, set-top box, or an entertainment control unit.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A method of operation on a license server in communication with a client device having a rights manager, the method comprising:
   generating, by the license server, a license defining rights to certain contents on the client device;
   obtaining, by the license server, a challenge identifier targeting an intended recipient, the intended recipient corresponding to at least one of the rights manager and the client device;
   encrypting, by the license server, the license and the challenge identifier into an encrypted communication for the intended recipient;
   challenging, by the license server, the intended recipient to demonstrate successful application of the license, wherein the challenging includes sending the encrypted communication to the intended recipient; and
   confirming, by the license server, that the encrypted communication was not intercepted by a spoofing device and that the intended recipient successfully applied the license, wherein the confirming includes receiving, by the license server from the intended recipient, a confirmation response corresponding to the challenge identifier.

2. The method of claim 1, wherein the challenge identifier comprises a resource locator identifying a confirmation resource provided by the license server, and wherein the receiving, by the license server from the intended recipient, the confirmation response comprises receiving an access request from the intended recipient for the confirmation resource.

3. The method of claim 2, wherein the challenge identifier further comprises a unique identifier identifying the license.

4. The method of claim 3, wherein the unique identifier identifying the license was obtained or derived from the license by the client device.

5. The method of claim 1, further comprising receiving, by the license server, information about the rights manager of the client device.

6. The method of claim 5, wherein the information about the rights manager of the client device includes a public key of the rights manager of the client device.

7. The method of claim 6, wherein the encrypting the license and the challenge identifier uses at least the public key of the rights manager of the client device.

8. The method of claim 1, further comprising, upon confirming that the intended recipient successfully applied the license, the license server updating a database to reflect the successful application of the license by the intended recipient.

9. The method of claim 1, wherein the license revokes rights to the certain contents on the client device.

10. The method of claim 1, wherein obtaining the targeted challenge identifier targeting the intended recipient comprises generating, by the license server, the challenge identifier including context information.

11. The method of claim 10, wherein the method further comprises storing, by the license server, the context information.

12. An apparatus, comprising:
    a networked interface to couple the apparatus with a network; a processor coupled with the networked interface; and
    a license server operable to be operated by the processor, in communication with a client device having a rights manager, to:
    generate a license defining rights to certain contents on the client device;
    obtain a challenge identifier targeting an intended recipient, the intended recipient corresponding to at least one of the rights manager and the client device;
    encrypt the license and the challenge identifier into an encrypted communication for the intended recipient;
    challenge the intended recipient to demonstrate successful application of the license, wherein the challenging includes sending the encrypted communication to the intended recipient; and
    confirm that the encrypted communication was not intercepted by a spoofing device and that the intended recipient successfully applied the license, wherein the confirming includes receiving, by the license server from the intended recipient, a confirmation response corresponding to the challenge identifier.

13. The apparatus of claim 12, wherein the challenge identifier comprises a resource locator identifying a confirmation resource provided by the license server, and wherein the receiving, by the license server from the intended recipient, the confirmation response comprises receiving an access request from the intended recipient for the confirmation resource.

14. The apparatus of claim 13, wherein the challenge identifier further comprises a unique identifier identifying the license.

15. The apparatus of claim 12, wherein the license server is further adapted to receive information corresponding to the rights manager of the client device.

16. The apparatus of claim 15, wherein the information corresponding to the rights manager of the client device includes a public key of the rights manager of the client device.

17. The apparatus of claim 16, wherein the encrypting the license and the challenge identifier uses at least the public key of the rights manager of the client device.

18. The apparatus of claim 12, wherein the license server is operable to, upon confirming that the intended recipient successfully applied the license, update a database to reflect the successful application of the license by the intended recipient.

* * * * *